July 31, 1923.

S. SNOWDEN

CAMERA

Filed Sept. 19, 1921

Inventor,
Scott Snowden,
By
Attorney

July 31, 1923.

S. SNOWDEN

CAMERA

Filed Sept. 19, 1921

Inventor,
Scott Snowden,
By Franks. Annemay
Attorney

Patented July 31, 1923.

1,463,446

UNITED STATES PATENT OFFICE.

SCOTT SNOWDEN, OF MODESTO, CALIFORNIA.

CAMERA.

Application filed September 19, 1921. Serial No. 501,573.

*To all whom it may concern:*

Be it known that I, SCOTT SNOWDEN, a citizen of the United States of America, and resident of Modesto, in the county of Stanislaus and State of California, have invented certain new and useful Improvements in Cameras, of which the following is a specification.

This invention relates to photography and particularly to cameras, the said invention being directed more particularly to improvements in landscape cameras of the type which are rotatably mounted on a tripod.

An object of this invention is to produce a camera carriage or support which will hold the camera in different angles of inclination on a tripod with the axis of the lens of the camera directed upwardly or downwardly, novel means being provided whereby the carriage or support can be rotated about a vertical axis on the tripod while being maintained in the said adjustment.

A further object of this invention is to provide motion transmitting means adapted to a camera support operative when the camera is moved to the different positions of adjustment indicated.

A still further object of this invention is to provide novel means whereby the said adjustment can be expeditiously accomplished by mechanism which is comparatively inexpensive and of simple construction.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
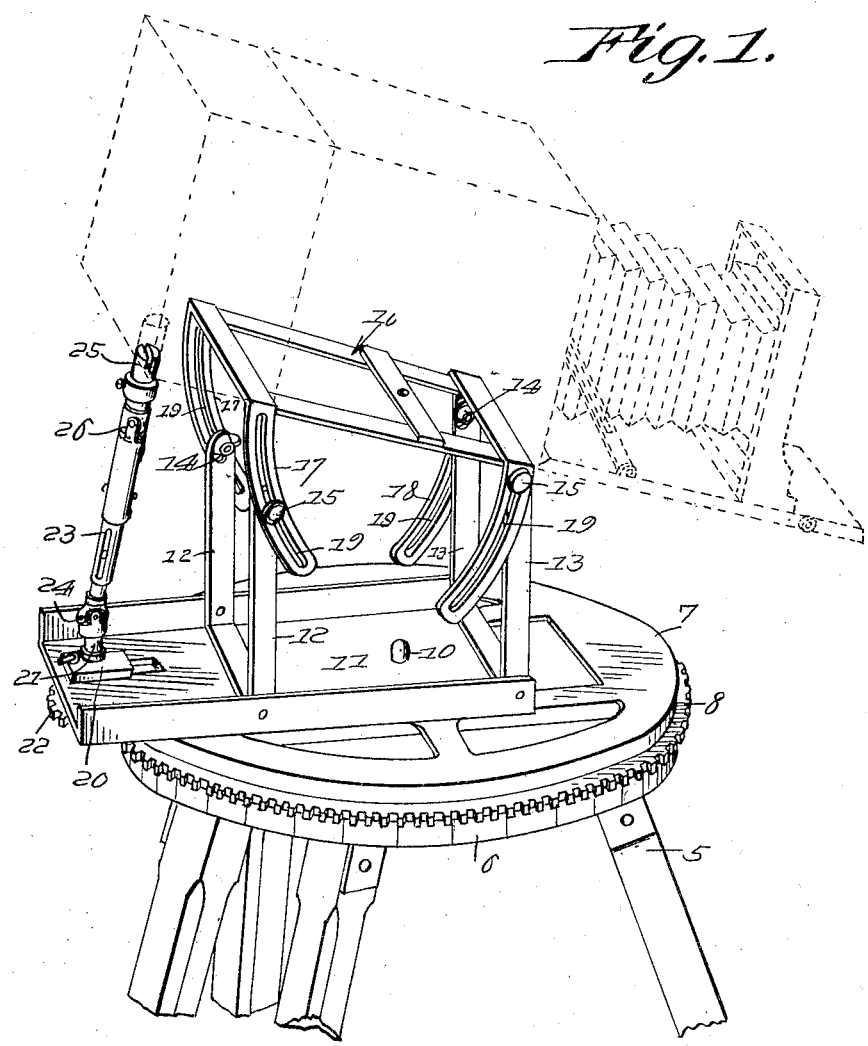
Figure 1 illustrates a perspective view of a tripod having a camera support embodying the invention applied thereto.
Figure 2:
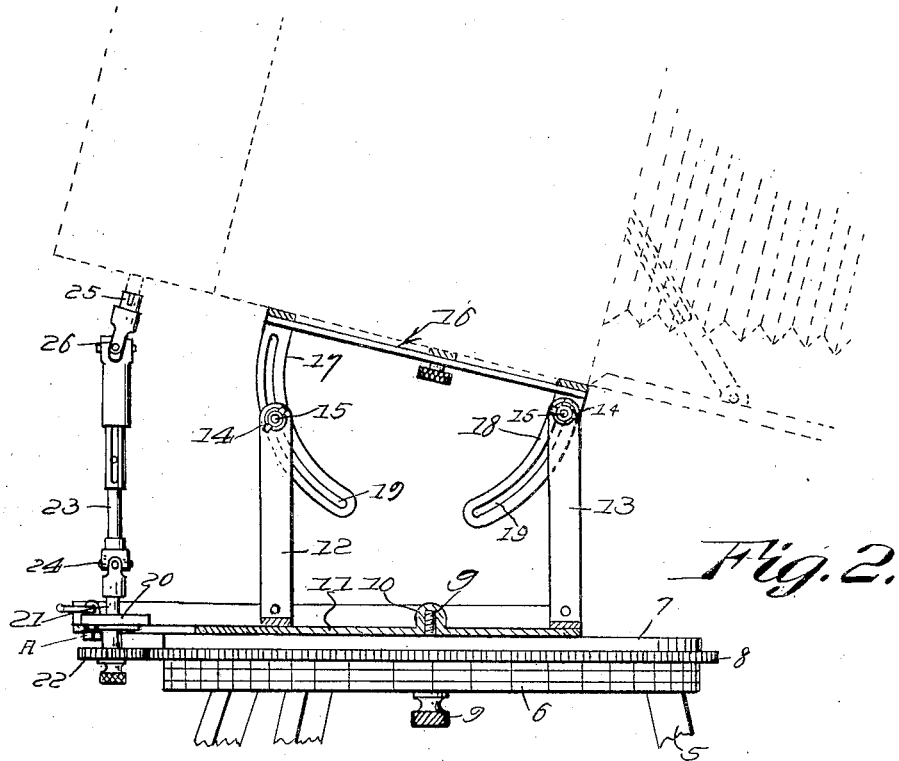
Figure 2 illustrates a longitudinal sectional view of the camera support.
Figure 3:
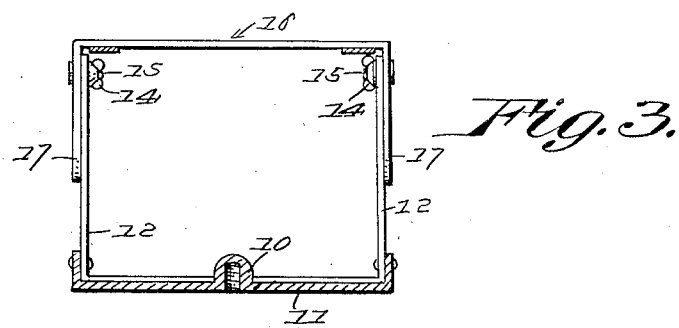
Figure 3 illustrates a transverse sectional view thereof.

In these drawings 5 denotes the tripod having a head 6 on which a disk or turn table 7 is rotatable. The head of the tripod has a ring rack 8 and the disk 7 has a screw 9 which is threaded in a boss 10 of the bed or base 11, in order that the base may be attached to the disk.

Pairs of posts 12 and 13 extend from and are pivotally connected to the base 11 and each post has a binding nut 14 threaded on a bolt 15. The camera support 16 is here shown as a skeleton structure having pairs of arms 17 and 18 at its ends, the pairs of arms being oppositely curved toward the center of the base and the arms have slots such as 19 to receive the bolts 15, permitting the camera support to be elevated at either end and held at different positions of adjustment by the nuts.

A bearing block 20 is slidably mounted in the base and a shaft 21 is journaled in it. A pinion 22 is secured on the shaft 21 and meshes with the teeth of the ring rack 8 and when the shaft 21 is rotated by the motor, which is contained in the camera-casing, the pinion 22 engaging the rack 8 will cause rotation of disk 7 upon which the camera-supporting structure is carried.

The shaft 21 is connected to a telescoping shaft 23 by a universal joint 24 and the shaft 23 is, in turn, connected with shaft 25 by a universal joint 26. Shaft 25 is connected to the usual motor-driven shaft, with which cameras of this type are usually provided.

As stated, the shaft 23 telescopes in order to accommodate itself to the height of the camera when it is tilted and serves to operate the pinion, regardless of the position of the camera within predetermined bounds. The universal joints allow the telescoping shaft to transmit the power from the camera to the pinion at different angles, according to the position of the camera. The bearing block 20 which is slidably mounted in the base has a friction device which is in the nature of a bolt A extending through the bearing block, the head of the bolt being intended to bear against the under surface of the base 11 to hold the said block at different positions of adjustment, in order that the position of the camera may be adjusted over the center of the tripod. When the camera is tilted up or down, it throws the weight off center, but by the adjustment provided in the bearing, the camera may be moved backward or forward to overcome the uneven distribution of weight which might otherwise result. The manner of rotatably supporting the base 11 with respect to the tripod is a known construction and need not, it is thought, be shown in detail.

It will be noted that this device is for use with a panoramic camera of the type shown in the Stark Patent, 621,545, dated March 21, 1899, as characterized from those devices used for converting ordinary film cameras into panoramic cameras.

I claim:

1. In a camera support, a tripod having a ring rack on its head, a disk rotatably mounted on the tripod, a base carried by the said disk, a rotatably mounted shaft carried by the base, a pinion on the said shaft engaging the ring rack, a camera support, means for adjustably connecting the camera support to the said base at each end of the said camera support.

2. In an adjustable camera support, a tripod, a base rotatably mounted on the tripod, a camera supporting means for supporting the camera either parallel to, or at an angle to said base, and means adapted to be driven by the film feeding motor of the camera, for rotating said base on said tripod.

3. In an adjustable camera holder, a tripod, a base rotatably mounted thereon, upstanding posts arranged in pairs carried by the said base, a camera support having downwardly and inwardly curved arms having slots, members carried by the posts extending through the slots, and nuts engaging the said means for clamping the said arms at different positions of adjustment.

4. In an adjustable camera holder, a tripod, a base rotatably mounted thereon, posts arranged in pairs on each side of the axis of rotation of the said base, a camera supporting element having downwardly and inwardly curved arms provided with slots, studs on the said posts projecting into the slots of the arms, and nuts threaded on the studs and holding the arms at different positions of adjustment.

5. In an adjustable camera holder, a tripod, a base rotatably mounted thereon, posts arranged in pairs on each side of the axis of rotation of the said base, a camera supporting element having downwardly and inwardly curved arms provided with slots, studs on the said posts projecting into the slots of the arms, nuts threaded on the studs and holding the arms at different positions of adjustment, and means adapted to be driven by the film-feeding motor of the camera for rotating said base on said tripod.

6. In an adjustable camera holder, a tripod, a base rotatably mounted thereon, a bearing adjustably secured on the base, a shaft extending through the base and means for supporting the camera holder from the base, a telescopic shaft extending from the camera to the first mentioned shaft, universal joints forming a part of the said shaft, a rack on the tripod and a pinion mounted on the shaft engaging the rack, and means for holding the camera holder at different positions of adjustment.

SCOTT SNOWDEN.